Figure 1:
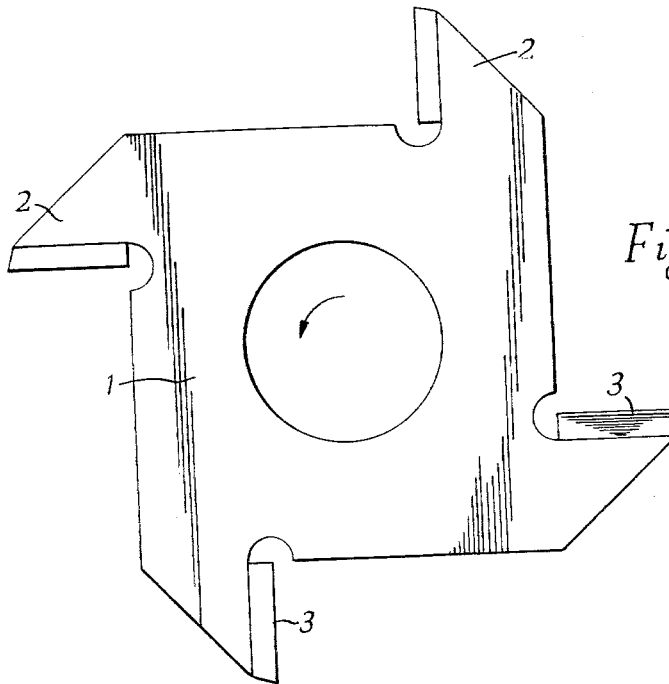

Jan. 11, 1966 V. SERRY 3,228,438
MACHINING OF TIMBER
Filed April 8, 1963 3 Sheets-Sheet 1

Victor Serry
INVENTOR

BY Wenderoth,
Lind & Ponack, ATTORNEYS

Jan. 11, 1966  V. SERRY  3,228,438
MACHINING OF TIMBER
Filed April 8, 1963  3 Sheets-Sheet 2
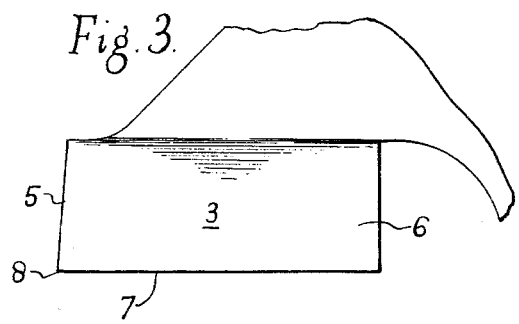
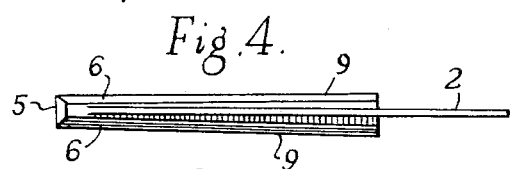
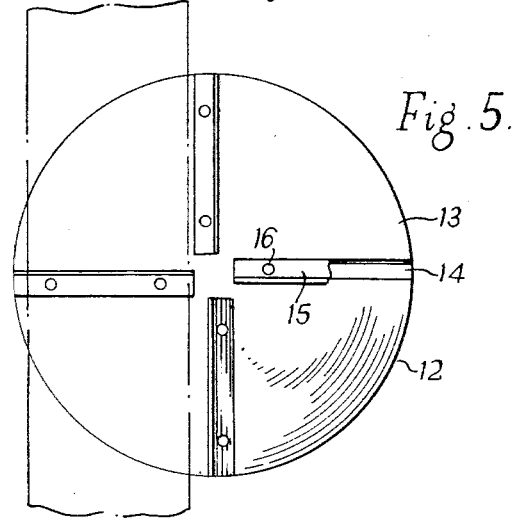
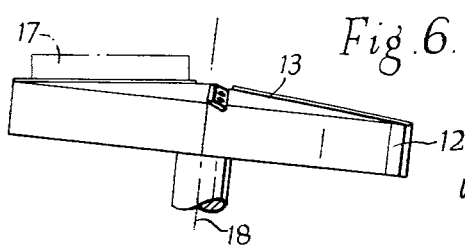
Victor Serry
INVENTOR Jan. 11, 1966 V. SERRY 3,228,438
MACHINING OF TIMBER
Filed April 8, 1963 3 Sheets-Sheet 3

Victory Serry
INVENTOR

BY Wenderoth,
Lind & Ponack ATTORNEYs

United States Patent Office 3,228,438
Patented Jan. 11, 1966

3,228,438
MACHINING OF TIMBER
Victor Serry, London, England, assignor to The Phoenix Timber Company Limited, Rainham, England
Filed Apr. 8, 1963, Ser. No. 271,116
12 Claims. (Cl. 143—140)

This invention relates to the machining of timber and is particularly concerned with the provision of a new design of cutting tool which enables a finer finish to be obtained than has heretofore been possible. It is well known, for example, in the case of circular saws that the cut faces produced by the action of the saw are so rough that for most normal purposes these faces have to be subjected subsequently to a surfacing operation. In consequence there is not only a substantial loss of timber but also an undesirable amount of work involved since for each unit length sawn there will be twice that length to be surfaced.

In the normal design of circular saws the saw teeth are set so as to project laterally from the plane of the saw blade and so as to provide clearance between the blade and the work. It is the laterally projecting edges of the saw teeth which produce the objectionable markings and in an effort to minimise this it has been proposed to shape or profile these edges so that they taper slightly towards their outer ends, and, in some cases, to form them so as to provide planing or scraping edges which operate on the sawn faces of the timber. Such proposals are not effective to obviate the objectionable markings and in any case they are impracticable since the metal of which saw blades, having teeth which must be periodically reset, must be made is quite incapable of standing up to such duty. It has also been proposed to use saws in which the teeth have no or no substantial set and in which the blade is hollow ground so as to provide the necessary clearance. Such a saw, however, still produces objectionable surface markings and is also inconvenient in use since it is not sufficiently robust. Moreover under actual working conditions it easily heats up, distorts and becomes unusable. Circular saws are known in which the teeth are reinforced by tips of hard metal such as tungsten carbide. Such tips are normally designed to cut on their outer peripheral edge only and they are quite short in the radial direction. Moreover their sides are usually parallel or taper slightly inwardly towards the centre of the saw. While such saws are more efficient than the normal circular saw, they still produce objectionable markings on the sawn faces of the work.

It is accordingly one object of the present invention to provide an improved circular saw which will produce a much finer finish on the sawn faces than has hitherto been possible.

The normally used methods of surfacing are also in themselves objectionable in that although they produce a relatively smooth face, this face is not itself flat but rather a succcession of waves or ripples, and it is a further object of the present invention to provide an improved means of surfacing timber which will reduce such defects.

According to the present invention, the improved tool comprises a toothed blade wherein each tooth carries a cutting tip which is of substantial length in the radial direction as compared with its width in a direction normal to the plane of the blade and which is formed with a cutting edge at its outer end and along at least one side, the side cutting edge projecting outwardly from the plane of the blade by a distance which increases from the outer end of the tip towards its centre.

In one embodiment of the improved tool of this invention, the side cutting edge may be straight but inclined at a small angle to the plane of the blade so as to project therefrom by an amount which increases from the radially outer to the radially inner end.

In another embodiment of the improved tool of this invention, the side cutting edge is curved outwardly or is of convex shape so that it projects outwardly from the plane of the blade by a distance which increases from the outer and inner end of the tip towards the centre thereof.

In both forms of the invention each side of the tip is preferably formed with a cutting edge while the cutting edge at the end of the tip preferably extends normal to the plane of the blade.

In the use of the first embodiment of this invention, as the improved tool is advanced into the timber to be sawn and the timber is cut by the cutting edge at the outer end of the tips, the side cutting edges operate on the sawn faces so as in effect to plane them. In this manner a very fine finish can be obtained although at the expense of producing surfaces which are slightly out of square. The deviation from squareness, however, may be quite small and less than the natural distortion which takes place subsequent to sawing. In practice, an inclination of the side cutting edges of up to about 2 to 3° to the central plane of the tool has been found to give satisfactory results.

While the improved tool of this invention may be used unaltered as a planing or surfacing cutter, it may be modified for such duty by omitting the outer cutting edge and the cutting edge on one side. When so used it is capable of producing a surface the waves or ripples on which are very much flattened and reduced as compared with those produced by a normal cylindrical planing cutter.

According to a feature of the present invention, therefore, an improved tool for planing or surfacing comprises a plurality of cutters which are mounted so that the cutting edges thereof lie on a conical surface of revolution having a solid angle which is only a few degrees less than 180° and the axis of which coincides with the axis of rotation of the tool. In use, the improved tool is so mounted that the axis of rotation is slightly inclined to the normal to the surface to be planed and so that one of the cutting edges lies parallel to the surface to be planed. When used in this manner, and owing to the very flat arc in which the cutting edges move towards and away from the work, the planed surfaces will be substantially flat and free from ripples.

The second above described embodiment of the improved tool does not produce the fine finish obtainable when the first embodiment described above is used, but is nevertheless capable of providing a finish which is better than that provided by conventional saws and approximates the finish given by a normal surfacing cutter. The leading face of the tip of this second embodiment may be generally oval in plan but the cutting edge at the outer end of the tip is preferably straight and extends normal to the plane of the blade. A saw having tips of this form produces a relatively smooth finish but which exhibits the waves or ripples which characterize the operation of a surfacing cutter. It has the advantage, however, that its depth of cut is not limited to the depth of the toothface as in the first embodiment and it will produce a planed surface even when the tooth passes right through the wood.

Figure 2:
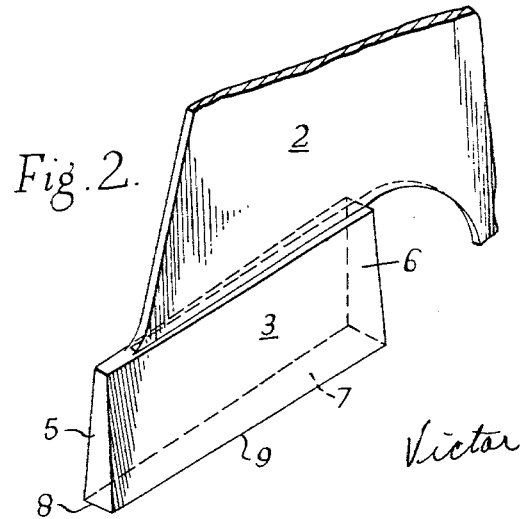
Figure 7:
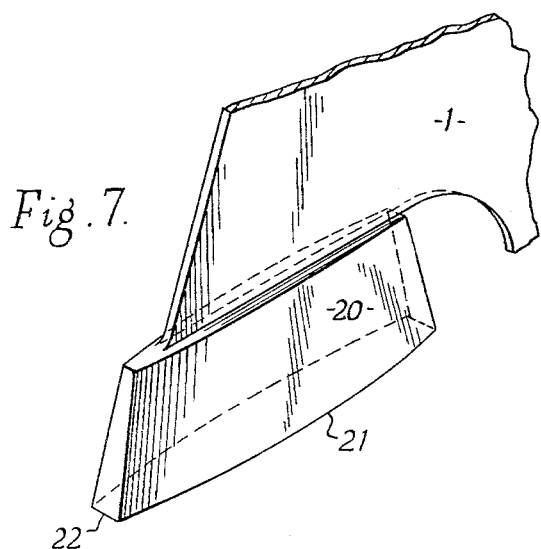
Figure 8:
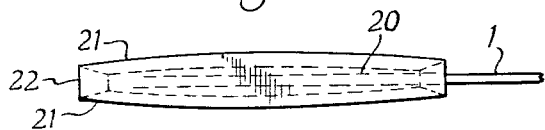
Figure 9:
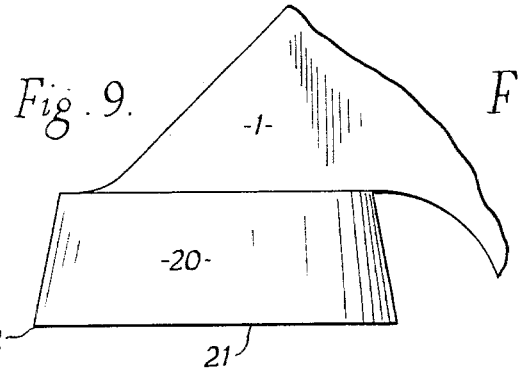
Figure 10:
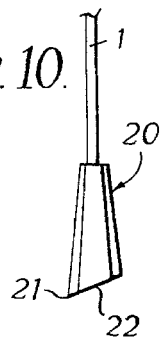
Figure 11:
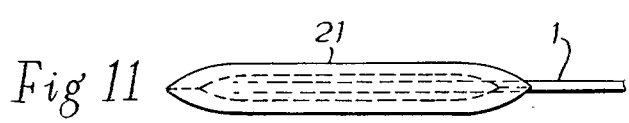

In order that the invention may be clearly understood it will now be described with reference to the accompanying drawings, in which:

FIGURE 1 is a side elevation of a circular saw constructed in accordance with the first embodiment of this invention, FIGURE 2 is a perspective view of one of the saw teeth and the cutting tip affixed thereto, FIGURE 3 is a side elevation and FIGURE 4 is a rear view of the saw tooth and tip shown in FIGURE 2, FIGURES 5 and 6 are a diagrammatic plan view and side view respectively of a planing or surfacing tool constructed in accordance with the invention, FIGURES 7 to 9 are respectively a perspective view, a plan view, and a side elevation of part of a circular saw constructed in accordance with the second embodiment of this invention, and FIGURES 10 and 11 are respectively an end view and a plan view of modifications of the embodiment of FIGURES 7 to 9.

Referring to FIGURES 1 to 4, the saw there shown comprises a blade 1 formed to provide four teeth 2 each of which has a tip 3 welded or brazed thereon. As shown, these tips are comparatively long as compared with their width and as may be seen more clearly in FIGURES 2 to 4 the top face 5 and side faces 6 thereof are inclined or bevelled relative to the front face 7 so as to form cutting edges 8 and 9. As may be seen from FIGURE 4, the side cutting edges 9 are each inclined to the plane of the blade 1 so as to project therefrom by a distance which increases towards the radially inner end of the tip.

In one particular example for a saw having an overall diameter of about 9" the tips were each about 1¼" long and their front faces 0.125" wide at the outer end and 0.135" at the inner end while the tip was inclined at an angle of about 30° to a radius with the outer edge leading. This angle may, however, be reduced and satisfactory operation can be obtained if the side cutting edges 9 extend substantially radially.

The improved saw is preferably used for producing a cut of a depth which is the same or less than the radial dimension of the tip 3. It may, however, be used for producing a deeper cut but in such case the cut face will show marks produced by the inner ends of the side cutting edges 9. Otherwise the sawn faces of the timber will have a smooth finish which may be at least as good as that produced by a surfacing machine.

In practising the invention, it has been found that hard metals such as tungsten carbide are not particularly suitable for the tips 3 possibly because the cutting edges cannot be made sharp enough and improved performance has been obtained when using high speed steel. Sharpening of the improved saw presents no particular problems since this is simply effected by grinding the front or leading face 7 of each tip and not the end face 5 and side faces 6 as is the conventional procedure in certain types of tools.

In general, the front or leading face 7 of the tip will extend normal to the plane of the blade 1. In some cases, however, this face may be bevelled from one side to the other so as to provide one sharp side cutting edge 9, in which case the tips are preferably bevelled alternately in opposite directions to provide a sharp side cutting edge on one side of one tip and the opposite side of the next tip. Obviously this may be controlled during the normal grinding of the tips to sharpen them.

FIGURES 5 and 6 show diagrammatically a planing and surfacing tool constructed in accordance with the invention. The tool comprises a disc 12 the surface 13 of which is formed as a cone of solid angle only one or two degrees less than 180°. The surface is formed with recesses 14 in which are accommodated the rear ends of flat cutters 15 which are secured by bolts 16. The cutters 15 are so disposed that their cutting edges extend radially from the centre of the disc and parallel to its surface.

Obviously cutters of other shape and different methods of mounting them may be used. The illustrated embodiment, however, shows the principle of construction and the disposition of the tool in relation to timber 17 to be planed or surfaced, the axis of rotation 18 of the tool being inclined at a slight angle to the normal to the face being planed so that the cutting edge lies parallel to that face at one point in its rotation.

FIGURES 7 to 9 show a portion of a circular saw constructed in accordance with the second embodiment of this invention. As shown, a tip 20 is secured on the saw blade 1 as in the saw described with reference to FIGURES 1 to 4. The leading face of the tip is generally oval in shape as shown in FIGURE 8 to provide side cutting edges 21 which extend convexly outwardly from the plane of the blade 1 so that each cutting edge projects outwardly by a distance which increases from the inner and outer end of the tip towards the centre. The outer cutting edge 22 is, however, straight and extends normal to the plane of the blade 1. As in the case of the saw of FIGURES 1 to 4, these cutting edges are formed by bevelling or relieving the end and side faces of the tip which is sharpened by grinding on the leading face. These tips are also preferably formed of high speed steel.

As illustrated in FIGURES 7 to 9, the leading face of the tip extends normal to the plane of the saw blade. If desired, however, the leading face of the tip may be bevelled from one side to the other as shown in FIGURE 10 so as to provide a cutting edge 21 on one side only and in such case the tips on the said blade are preferably bevelled alternately in opposite directions.

It will be appreciated that in this embodiment it is only necessary that the side cutting edge 21 projects further from the plane of the saw blade at points intermediate its ends than it does at the ends and the exact shape of this edge as seen when looking at its leading face may be varied as desired. In general, however, a smooth convex shape will produce the best finish. In this embodiment it is also not essential that an outer cutting edge is provided since the two complementary convex cutting surfaces of the same or adjacent tips may merge in a point at their outer ends.

Likewise, satisfactory results may be obtained if, as shown in FIGURE 11, the major portion of the side cutting edge 21 is straight and parallel with the plane of the blade provided that at the outer and inner ends the cutting edge is curved smoothly towards the said plane.

In this embodiment of the invention, the leading face of the tip, as in the embodiment of FIGURES 1 to 4, is preferably inclined to a radius at an angle of, say 25° to 30° with the outer end leading.

What I claim is:

1. A saw for timber comprising a toothed blade having a cutting tip mounted on each tooth, each said cutting tip having a length in the radial direction which is substantial as compared with its width in a direction normal to the plane of the blade and having smooth, unbroken cutting edges on opposite sides thereof which projects outside the plane of the blade by a distance which decreases at least towards the radially outer end of the tip, said cutting tips each being mounted on the teeth with the radially outer end of the tip leading the radially inner end of the tip in the direction of rotation of the blade, each said cutting tip being symmetrical with respect to the plane of the blade from a point slightly radially inwardly of the radially outermost extremity thereof to the radially innermost end thereof.

2. A saw for timber comprising a disc having a plurality of cutting tips mounted on the periphery thereof, each said cutting tip having a length in a radial direction which is greater than its width in a direction normal to the plane of the disc and having smooth unbroken cutting edges on opposite sides thereof, said cutting edges being curved so that it projects outside the plane of the disc by a distance which decreases towards the radially outer end and towards the radially inner end of the tip, said cutting tips each having a substantially flat leading face inclined to a radius of the tool with the radially outer end of the tip leading the radially inner end of the tip in the direction of rotation of the blade, each said cutting tip being symmetrical with respect to the plane of the blade from a point slightly radially inwardly of the radially outermost extremity thereof to the radially innermost end thereof.

3. A saw for timber comprising a toothed blade having a cutting tip mounted on each tooth, said cutting tip being of substantial length in the radial direction as compared with its width in a direction normal to the plane of the blade and having a cutting edge at its outer end and along opposite sides, the side cutting edges being straight and inclined at a small angle to the plane of the blade so as to project therefrom by an amount which increases from the radially outer to the radially inner end of said tip, said cutting tips each having a substantially flat leading face inclined to a radius of the tool with the radially outer end of the tip leading the radially inner end of the tip in the direction of rotation of the blade, each said cutting tip being symmetrical with respect to the plane of the blade from a point slightly radially inwardly of the radially outermost extremity thereof to the radially innermost end thereof.

4. A saw as claimed in claim 1, said cutting tip further having a cutting edge at the radially outer end thereof which extends normal to the plane of the blade.

5. A saw according to claim 3, wherein the angle of inclination of the side cutting edges to the plane of the blade is not greater than 3°.

6. A saw according to claim 4, wherein the end and the side faces of the tip are bevelled to form the cutting edges.

7. A saw according to claim 1, wherein the tip is positioned with the side cutting edges extending at an angle to a radius which is not greater than 30°.

8. A saw for timber comprising a toothed disc, a plurality of cutting tips one mounted on each of the teeth on said disc, each said cutting tip having a length in the radial direction which is substantial as compared with its width in a direction normal to the plane of the blade and having radially extending side cutting edges on opposite sides of the tip which project outwardly from the plane of the disc by a distance which decreases in a smooth curve having a large radius of curvature towards the radially inner and radially outer ends of the tip, said cutting tips each being mounted on the disc with the radially outer end of the tip leading the radially inner end of the tip in the direction of rotation of the blade, each said cutting tip being symmetrical with respect to the plane of the blade from a point slightly radially inwardly of the radially outermost extremity thereof to the radially innermost end thereof.

9. A saw for timber comprising a toothed disc, a plurality of cutting tips one mounted on each of the teeth on the disc, each said cutting tip having a length in the radial direction which is substantial as compared with its width in a direction normal to the plane of the blade and having radially extending side cutting edges which project outwardly from the plane of the disc, said cutting edges extending parallel with said plane over a part of its length and inclining in a smooth curve having a large radius of curvature towards said plane at its radially inner and outer ends, said cutting tips each being mounted on the disc with the radially outer end of the tip leading the radially inner end of the tip in the direction of rotation of the blade, each said cutting tip being symmetrical with respect to the plane of the blade from a point slightly radially inwardly of the radially outermost extremity thereof to the radially innermost end thereof.

10. A saw as claimed in claim 8, in which said cutting tip has a cutting edge formed on the radially outer end of said tip and extending normal to said plane.

11. A saw as claimed in claim 1 in which said cutting tips each have a substantially flat leading face inclined to a radius of the tool, the flat leading face being normal to the plane of the cutting tip.

12. A saw as claimed in claim 1 in which said cutting tips each have a substantially flat leading face inclined to a radius of the tool, the flat leading face being inclined at an angle to the plane of the cutting tip, the inclination being in opposite directions on alternate tips.

References Cited by the Examiner
UNITED STATES PATENTS

| | | | |
|---|---|---|---|
| 777,250 | 12/1904 | Eynon | 29—105 |
| 2,657,720 | 11/1953 | Wolfe | 143—140 |
| 2,671,947 | 3/1954 | Vander Linde | |
| 2,720,229 | 10/1955 | Drake | 143—140 |
| 2,904,086 | 9/1959 | Cowley et al. | 144—218 X |
| 2,913,024 | 11/1959 | Key | 143—140 X |
| 3,009,457 | 11/1961 | Rasmussen et al. | 144—219 X |

FOREIGN PATENTS

| | | |
|---|---|---|
| 597,203 | 8/1959 | Italy. |

WILLIAM W. DYER, Jr., *Primary Examiner.*

DONALD R. SCHRAN, *Examiner.*